(12) United States Patent
Bean et al.

(10) Patent No.: US 11,119,648 B2
(45) Date of Patent: *Sep. 14, 2021

(54) OBFUSCATING MOBILE DEVICE PASSWORDS THROUGH PATTERN GENERATION

(71) Applicant: INTERNATIONAL BUSINESS MACHINES CORPORATION, Armonk, NY (US)

(72) Inventors: Chris R. Bean, Chandler's Ford (GB); Stephen R. F. Head, Southampton (GB); Sophie D. Green, Andover (GB); Madeleine R. Neil Smith, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,430

(22) Filed: Nov. 7, 2019

(65) Prior Publication Data
US 2020/0073549 A1     Mar. 5, 2020

Related U.S. Application Data

(63) Continuation of application No. 15/437,644, filed on Feb. 21, 2017, now Pat. No. 10,558,355.

(51) Int. Cl.
*H04L 29/06* (2006.01)
*G06F 3/0488* (2013.01)
(Continued)

(52) U.S. Cl.
CPC ...... *G06F 3/04883* (2013.01); *G06F 3/04817* (2013.01); *G06F 3/04886* (2013.01); *G06F 21/36* (2013.01); *G06F 2221/2123* (2013.01)

(58) Field of Classification Search
CPC ............. G06F 3/04883; G06F 3/04817; G06F 3/04886; G06F 21/36; G06F 2221/2123
See application file for complete search history.

(56) References Cited

U.S. PATENT DOCUMENTS

| 7,836,513 B2 | 11/2010 | Cradick et al. |
| 8,174,503 B2 | 5/2012 | Chin |

(Continued)

FOREIGN PATENT DOCUMENTS

| WO | 2014/155196 | 10/2014 |
| WO | 2015/096939 | 7/2015 |

OTHER PUBLICATIONS

Zeis, "CrackBerry Asks: Are you using Picture Password?", http://crackberry.com/are-you-using-picture-password, Nov. 25, 2013, 46 pages.

(Continued)

*Primary Examiner* — Carl G Colin
*Assistant Examiner* — Hany S. Gadalla
(74) *Attorney, Agent, or Firm* — Nicholas Bowman; Andrew D. Wright; Roberts Calderon Safran & Cole, P.C.

(57) ABSTRACT

A computer-implemented a method for authenticating a user includes: displaying, by a computer device, a first user interface on a display; receiving, by the computer device, user input defining a first pattern; displaying, by the computer device, a second pattern on the display, wherein the second pattern is different than the first pattern; comparing, by the computer device, the first pattern to a predefined pattern; and based on the comparing, the computer device performing one of: re-displaying the first user interface when the first pattern does not match the predefined pattern; and displaying a second user interface when the first pattern does match the predefined pattern.

20 Claims, 5 Drawing Sheets

(51) Int. Cl.
*G06F 21/36* (2013.01)
*G06F 3/0481* (2013.01)

(56) References Cited

U.S. PATENT DOCUMENTS

| | | |
|---|---|---|
| 8,504,842 B1 | 8/2013 | Meacham |
| 9,117,068 B1 | 8/2015 | Zhang et al. |
| 9,710,639 B1 | 7/2017 | Saini |
| 10,496,852 B1* | 12/2019 | Marimuthu ............ G06F 21/31 |
| 2007/0271466 A1 | 11/2007 | Mak et al. |
| 2008/0235788 A1* | 9/2008 | El Saddik ............... G06F 21/36 726/18 |
| 2011/0004928 A1* | 1/2011 | Won ........................ G09C 1/00 726/7 |
| 2012/0042378 A1 | 2/2012 | Harris |
| 2012/0252410 A1 | 10/2012 | Williams |
| 2013/0094770 A1 | 4/2013 | Lee et al. |
| 2014/0075512 A1 | 3/2014 | Vargas et al. |
| 2014/0223378 A1 | 8/2014 | Sinha |
| 2014/0310805 A1* | 10/2014 | Kandekar ............. H04L 63/083 726/19 |
| 2014/0366127 A1 | 12/2014 | Deluca et al. |
| 2015/0324113 A1 | 11/2015 | Kapp et al. |
| 2016/0054884 A1 | 2/2016 | Gay et al. |
| 2016/0164681 A1 | 6/2016 | Jiang et al. |
| 2016/0180067 A1 | 6/2016 | Kapp et al. |
| 2016/0202881 A1 | 7/2016 | Ahmad et al. |
| 2016/0203308 A1 | 7/2016 | Ahmad et al. |
| 2016/0283709 A1 | 9/2016 | Potnuru et al. |
| 2016/0283710 A1* | 9/2016 | Kwon ................. G06F 3/04883 |
| 2017/0177851 A1 | 6/2017 | Sawant et al. |
| 2017/0235962 A1 | 8/2017 | Clark |
| 2018/0239882 A1 | 8/2018 | Bean et al. |
| 2020/0356186 A1* | 11/2020 | Cutler ..................... G06F 3/016 |

OTHER PUBLICATIONS

"List of IBM Patents or Patent Applications Treated as Related", dated Nov. 7, 2019, 1 page.

* cited by examiner

OBFUSCATING MOBILE DEVICE PASSWORDS THROUGH PATTERN GENERATION

BACKGROUND

The present invention generally relates to mobile device security and, more particularly, to systems and methods for securing mobile device passwords.

Mobile devices, such as smartphones and tablet computers, use a variety of techniques to secure the devices from unauthorized use. A popular security technique is a pattern password in which a user must draw a predefined pattern on a touchscreen of a mobile device in order to unlock the mobile device. Some pattern password techniques display a visual depiction of the pattern being drawn, i.e., a line is displayed that follows the user's finger movement on the screen. Other pattern password techniques do not display the pattern, i.e., no visual indication of the user's finger movement across the screen is displayed.

SUMMARY

In a first aspect of the invention, there is a method for authenticating a user, the method including: displaying, by a computer device, a first user interface on a display; receiving, by the computer device, user input defining a first pattern; displaying, by the computer device, a second pattern on the display, wherein the second pattern is different than the first pattern; comparing, by the computer device, the first pattern to a predefined pattern; and based on the comparing, the computer device performing one of: re-displaying the first user interface when the first pattern does not match the predefined pattern; and displaying a second user interface when the first pattern does match the predefined pattern.

In another aspect of the invention, there is a system including a mobile device comprising a processor, a memory, and a touchscreen display. An operating system stored in the memory and executed by the processor is configured to: display a lock screen on the touchscreen display of the mobile device; receive a user input on the touchscreen display, the user input defining a first pattern; display a decoy pattern based on the user input defining the first pattern, wherein the decoy pattern is different than the first pattern; compare the first pattern to a predefined pattern; and based on the comparing, perform one of: re-display the lock screen on the touchscreen display when the first pattern does not match the predefined pattern; and display a home screen on the touchscreen display when the first pattern does match the predefined pattern.

In another aspect of the invention, there is a computer program product for authenticating a user, the computer program product including a computer readable storage medium having program instructions embodied therewith. The program instructions are executable by a mobile device to cause the mobile device to: display a lock screen on a touchscreen display of the mobile device; receive a user input on the touchscreen display, the user input defining a first pattern; dynamically create a decoy pattern based on the user input defining the first pattern; display the decoy pattern concurrently with the receiving the user input defining the first pattern; compare the first pattern to a predefined pattern; and based on the comparing, perform one of: re-display the lock screen on the touchscreen display when the first pattern does not match the predefined pattern; and display a home screen on the touchscreen display when the first pattern does match the predefined pattern.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
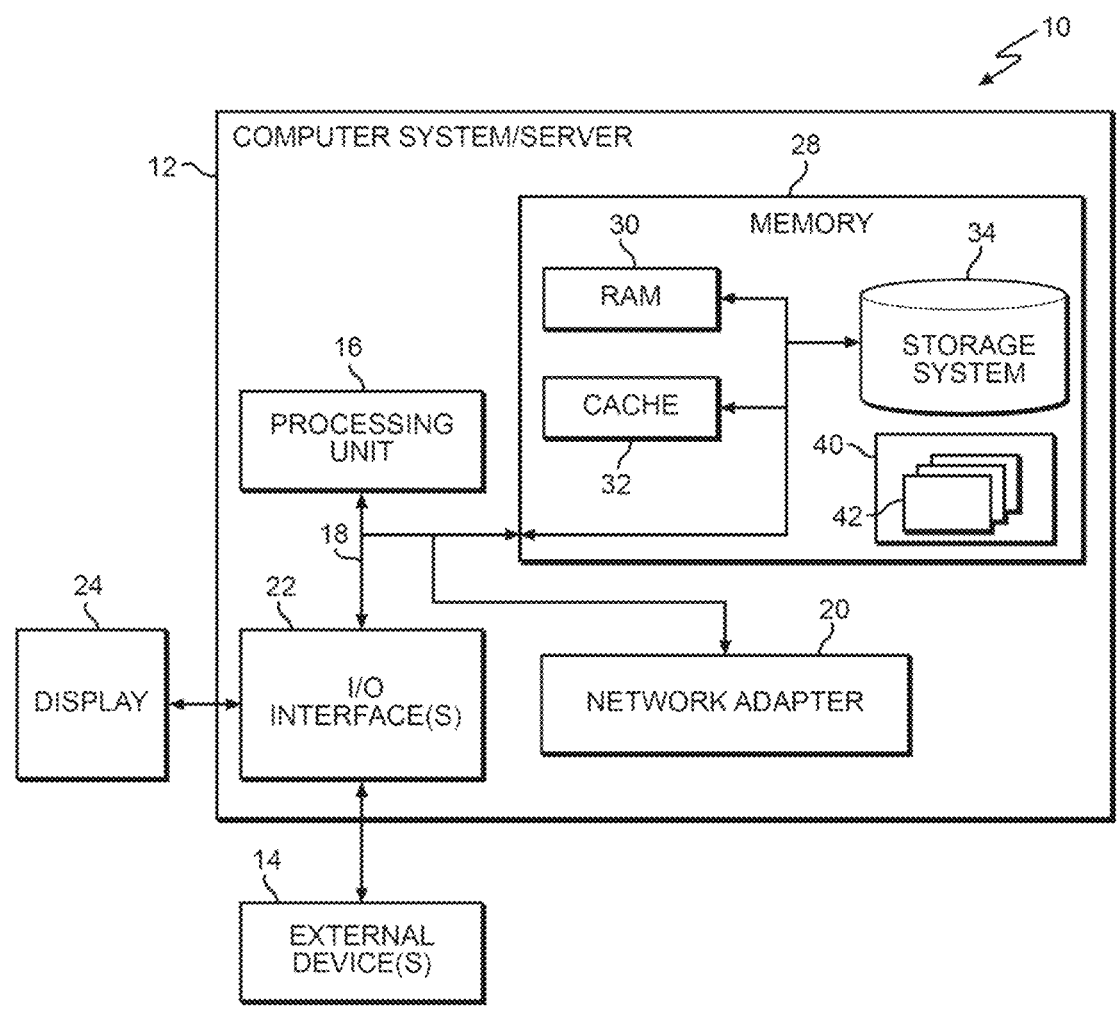
FIG. 1 depicts a computing infrastructure according to an embodiment of the present invention.

The present invention generally relates to mobile device security and, more particularly, to systems and methods for securing mobile device passwords. Pattern password techniques that do not display the pattern provide a slight increase in security from those pattern password techniques that display the pattern. However, even when using a pattern password technique that does not display the pattern, an onlooker may determine the pattern password by observing the user's finger movement when the user is drawing the pattern. Aspects of the invention make pattern passwords more secure by displaying a decoy (i.e., incorrect) pattern on the screen while the user is entering the true (i.e., correct) pattern password. In embodiments, the decoy pattern is dynamically created based on the user's touch-based inputs to the mobile device. Displaying a decoy pattern distracts an onlooker and makes it less likely that an onlooker will determine the correct pattern from the user's finger movement. In this manner, implementations of the invention provide enhanced security for mobile devices that use pattern passwords.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2A:
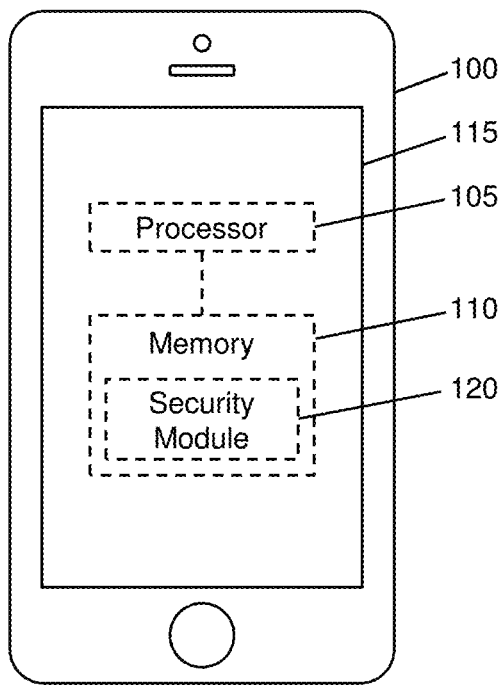
FIG. 2A shows a block diagram of an exemplary mobile device in accordance with aspects of the invention.

FIG. 2A shows a block diagram of an exemplary mobile device 100 in accordance with aspects of the invention. The mobile device 100 may be a smartphone, tablet computer, laptop computer, smart watch, or other mobile computing device. The mobile device 100 includes at least a processor 105, a memory 110, and a display 115, which may be similar in arrangement and function to elements of the computer system 10 of FIG. 1. The display 115 is a touchscreen display that is configured to both display a visual output and receive user input via touch, such as by a finger, stylus, or specialized pen. The display 115 may utilize display technology including but not limited to LCD or LED, and may utilize touchscreen technology including but not limited to capacitive, resistive, or surface acoustic wave. The processor 105 may run an operating system and one or more applications stored in the memory 110, and may be operatively connected to the display 115 to control what is visually displayed by the display 115. The processor 105 may also be configured to detect user touch input at the display 115 and determine a location and type of touch. For example, the processor 105 may detect and determine types of user input gestures at the display 115 such as tap, swipe, touch and hold, drag, double tap, pinch, spread, flick, etc.

In embodiments, the memory 110 includes a security module 120, which may be one or more program modules 42 as described with respect to FIG. 1. The security module 120 may be included in the operating system of the mobile device 100 or an application stored on the mobile device 100. The security module 120 is configured to lock the mobile device 100 based on one of: a user providing a predefined lock input to the mobile device 100, and a predefined amount of time having elapsed in which no input is received by the mobile device 100.

Figure 2B:
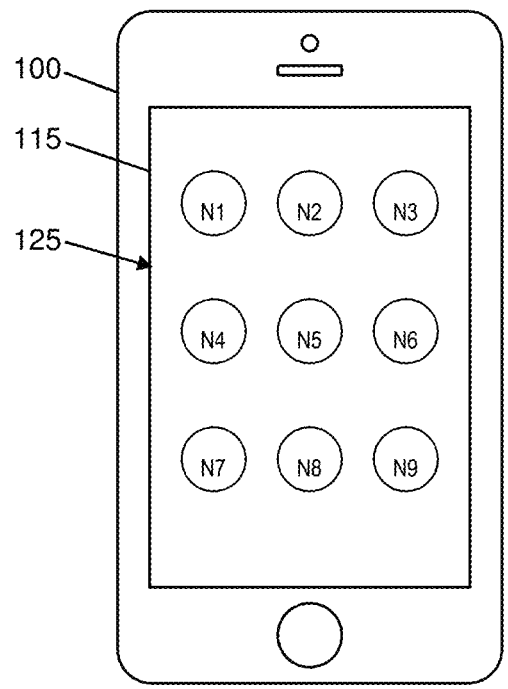
FIGS. 2B, 2C, and 2D show security aspects of the mobile device in accordance with aspects of the invention.
Figure 2C:
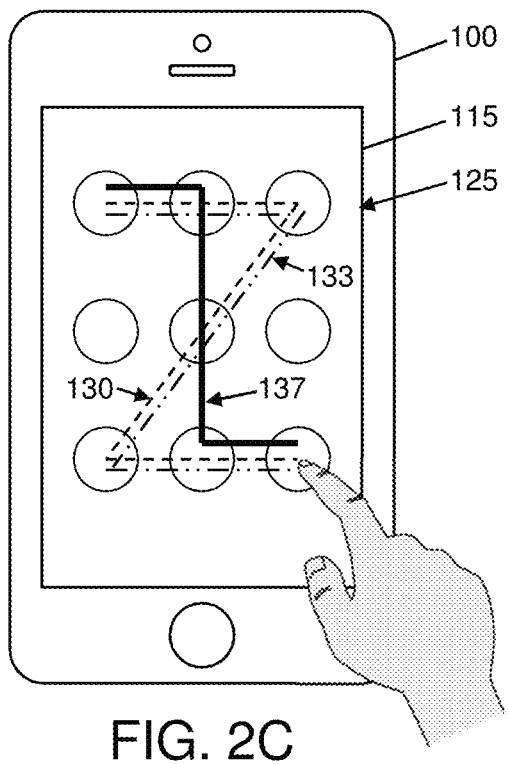
Figure 2D:
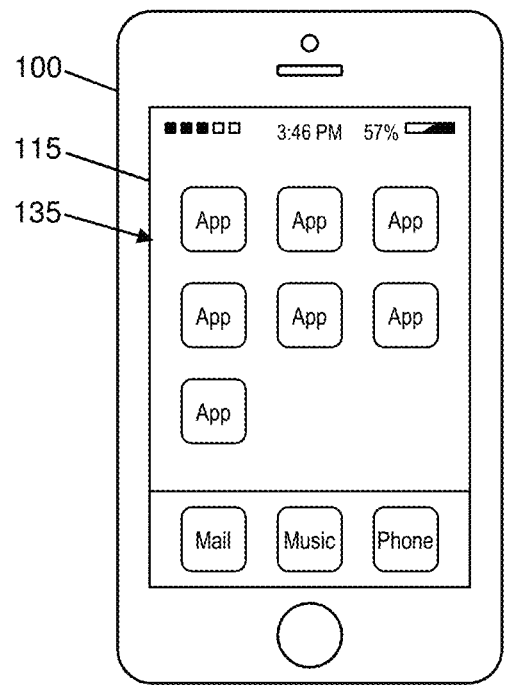

FIGS. 2B-D show security aspects of the mobile device 100 in accordance with aspects of the invention. As shown in FIG. 2B, the mobile device 100 displays a lock screen 125 when the mobile device 100 is in a locked state. The lock screen 125 may include a visual keypad or other indicia that presents a security challenge to a user attempting to unlock the mobile device 100. For example, the lock screen may display a number of nodes N1-N9. The security module 120 is configured to compare user input provided at the lock screen 125 to a predefined pattern. Based on the comparing, the security module 120 is configured to do one of: unlock the mobile device 100 when the user input matches the predefined pattern, and maintain the mobile device 100 as locked when the user input does not match the predefined pattern. For example, as shown in FIG. 2C, a user may provide input when presented with the lock screen 125, the input including the user moving their finger across the surface of the display 115 to draw a pattern.

Still referring to FIG. 2C, the security module 120 compares the user input pattern (indicated by dashed line 130) to a predefined pattern (indicated by dash-dot-dot line 133) defined by data stored in the memory 110. In the event the user input pattern 130 matches the predefined pattern 133, then the security module 120 unlocks the mobile device 100 which causes the display 115 to display a home screen 135 (as shown in FIG. 2D) or a screen of an active application (not shown). In the event the user input pattern 130 does not match the predefined pattern 133, then the security module 120 does not unlock the mobile device 100, and the display 115 continues to display the lock screen 125. The user input pattern 130 and the predefined pattern 133 are depicted in FIG. 2C for understanding aspects of the invention, but are not visually displayed by the mobile device 100. As described herein, the lock screen 125 may constitute a first user interface and the home screen 135 may constitute a second user interface that is different than the first user interface.

As shown in FIG. 2C, in accordance with aspects of the invention, the mobile device 100 displays a decoy pattern (indicated by solid line 137) on the display 115 concurrently with the user entering the user input pattern 130. In embodiments, the decoy pattern 137 is an incorrect pattern that differs in shape from the user input pattern 130 and the predefined pattern 133. In this manner, an onlooker watching the user enter the user input pattern 130 sees a visual display of the decoy pattern 137. The visual display of the decoy pattern 137 makes it less likely that an onlooker will determine the predefined pattern 133 by watching the user enter the user input pattern 130.

In embodiments the security module 120 is configured to dynamically generate the decoy pattern 137 in real time (i.e., concurrently with the user input pattern 130) and based on random selection of nodes from sets of candidate nodes. In an exemplary implementation, the security module 120 is configured to generate the decoy pattern 137 in segments, with each segment extending between two nodes of the group of nodes (e.g., nodes N1-N9 as depicted in FIG. 2B). In the example shown in FIG. 2C, the decoy pattern 137 includes: a first segment between nodes N1 and N2; a second segment between nodes N2 and N5; a third segment between nodes N5 and N8; and a fourth segment between nodes N8 and N9. According to aspects of the invention, the nodes that define the segments of the decoy pattern 137 are selected randomly (by the security module 120) from determined sets of candidate nodes. Specifically, for each successive segment of the decoy pattern, the first node of the segment coincides with the second node of the previous segment (i.e., to maintain visual continuity of successive segments of the decoy pattern), and the second node of the segment is randomly selected from a dynamically determined set of candidate nodes. Due to this random selection, the decoy pattern 137 may be different each time a user enters the user input pattern 130.

Figure 3A:
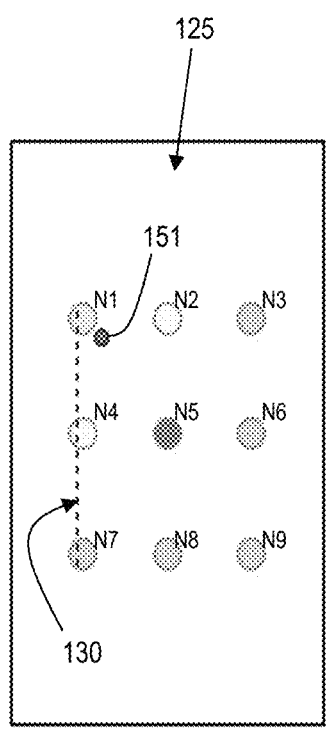
FIGS. 3A, 3B, and 3C shows candidate node identification in accordance with aspects of the invention.
Figure 3B:
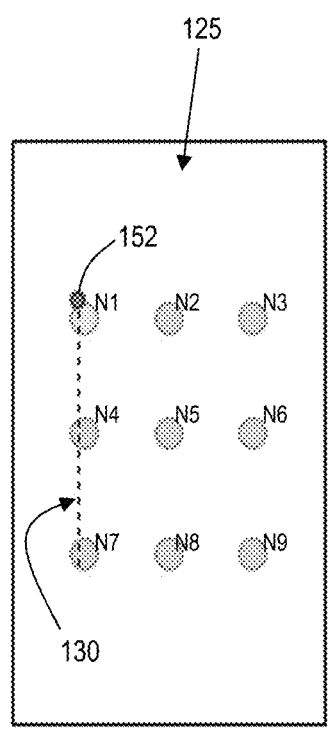
Figure 3C:
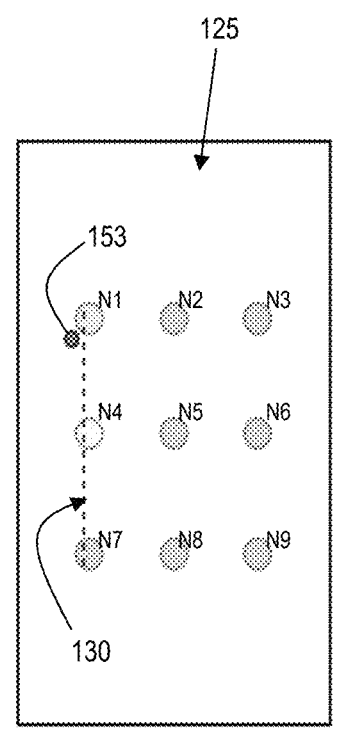

FIGS. 3A-C show candidate node identification of a first node of a first segment of a decoy pattern in accordance with aspects of the invention. FIGS. 3A-C show a diagrammatic depiction of the lock screen 125 including nodes N1-N9, and three different starting positions 151, 152, 153 of the user's finger as the user begins to draw the user input pattern 130 to unlock the mobile device 100. It is unlikely that a user contacts the touchscreen display in the exact same location each time they enter their pattern password, and starting positions 151, 152, 153 represent how a user might contact the touchscreen display at different locations when entering the same user input pattern 130 at different times. In embodiments, the security module 120 uses a starting position of the user's finger to determine a set of candidate nodes, and randomly selects the first node of the first segment of the decoy pattern from the determined set of candidate nodes.

In the example shown in FIG. 3A, the user's finger starts at position 151 when the user begins to enter the user input pattern 130. Based on the location of position 151 relative to the nodes N1-N9, the security module 120 determines a set of candidate nodes for the first node of the first segment of the decoy pattern. In this example, the set of candidate nodes includes nodes N1, N2, N4, and N5, and the security module 120 randomly selects one of these nodes as the first node of the first segment of the decoy pattern.

Still referring to FIG. 3A, in embodiments the security module 120 may be configured to weight each candidate node equally when randomly selecting one of the candidate nodes as the starting node. In other embodiments, the security module 120 is configured to assign relative weights to the nodes included in the set of candidate nodes, with the respective weight of each node being based on the proximity of the starting location 151 relative to the particular node. In the example of FIG. 3A, the security module 120 assigns weights as follows: node N1 as a strong decoy candidate node, nodes N2 and N4 as moderate decoy candidate nodes, and node N5 as a weak decoy candidate node. The security module 120 is configured to use the weights to skew the random selection of the starting node, e.g., such that a strong node has a higher chance of being selected compared to that of moderate node, and a moderate node has a higher chance of being selected compared to that of weak node. In an exemplary implementation, based on the assigned weights (e.g., strong, moderate, and weak), the security module 120 may assign node N1 may a range of 1-35, node N2 a range of 36-60, node N4 a range of 61-85, and node N5 a range of 86-100. To determine which of the candidate nodes is selected as the first node of the decoy pattern, the security module 120 randomly generates a number between 1-100, and selects the candidate node having the assigned range that includes the randomly generated number. The foregoing is but one possible example of weighting and random selection that may be employed in implementations of the invention. Aspects of the invention are not limited to this example, and the security module 120 may be programmed with other logic for assigning weights to the nodes of the set of candidate nodes and using the assigned weights when randomly selecting one of the nodes from the set of candidate nodes.

In the example shown in FIG. 3B, the user's finger starts at position 152 when the user begins to enter the user input pattern 130. Based on the location of position 152 relative to the nodes N1-N9, the security module 120 determines a set of candidate nodes for the first node of the first segment of the decoy pattern. In this example, the set of candidate nodes includes node N1. Since the set of candidate nodes includes only a single node (N1 in this example), the security module 120 selects this node as the first node of the decoy pattern.

In the example shown in FIG. 3C, the user's finger starts at position 153 when the user begins to enter the user input pattern 130. Based on the location of position 153 relative to the nodes N1-N9, the security module 120 determines a set of candidate nodes for the first node of the first segment of the decoy pattern. In this example, the set of candidate nodes includes nodes N1 and N4, and the security module 120 randomly selects one of these nodes as the first node of the first segment of the decoy pattern. The nodes N1 and N4 may be weighted equally (purely random) or may be assigned different weights when the security module 120 randomly selects one as the first node of the decoy pattern.

For example, based on the distance from location 152 to each of nodes N1 and N2, node N1 may be assigned a strong weight and node N4 may be assigned a moderate weight, such that node N1 has a higher probability of being selected as the first node of the decoy pattern.

After the security module 120 determines the first node of the decoy pattern, e.g., as described with respect to FIGS. 3A-C, and as the user continues to enter the user input pattern 130, the security module 120 determines a next set of candidate nodes for the next node in the decoy pattern (i.e., the second node in the first segment of the decoy pattern), and randomly selects one of the nodes from the next set of candidate nodes as the next node in the decoy pattern. The security module 120 continues generating the decoy pattern in this manner (i.e., determining a set of candidate nodes and then randomly selecting one of the nodes from the set of candidate nodes) until the decoy pattern is complete. In embodiments, the security module 120 is configured to determine each next set of candidate nodes based on at least one of: current position of the user's finger on the display 115 relative to node locations; appearance of the predefined pattern 133; link with the decoy pattern 137; amount of time (number of nodes) elapsed since use of a decoy node; and number of remaining nodes that could be decoy nodes.

Since a set of candidate nodes may include a node that corresponds to a node in the predefined pattern 133 (i.e., the correct pattern), it is possible for the decoy pattern 137 to include some nodes and even some line segments that are included in the predefined pattern 133. To ensure that the decoy pattern 137 does not match the predefined pattern 133 too closely, the security module 120 may be configured to increase the probability that a next node of the decoy pattern does not correspond to a node in the predefined pattern 133 based on a current node in the decoy pattern corresponding to a node in the predefined pattern 133. For example, when the security module 120 selects a node for the decoy pattern and that node is included in the predefined pattern 133, the security module 120 may be configured to increase the probability that the next node in the decoy pattern is a node that is not included in the predefined pattern 133. To accomplish this, the security module 120 may be programmed to adjust the weight of one or more nodes included in the next set of candidate nodes, e.g., by demoting a weight of a node from strong to moderate or from moderate to weak, or by eliminating a node from the set of candidate nodes altogether.

FIGS. 4-12 show examples of user input patterns and corresponding decoy patterns generated and displayed in accordance with aspects of the invention. In each figure, the dashed line represents a user input pattern (e.g., similar to pattern 130) that is entered by a user at a lock screen 125 of the mobile device 100, and the solid line represents the corresponding decoy pattern that is generated by the security module 120 and visually displayed by the mobile device 100 concurrently with the user entering the user input pattern.

Figure 4:
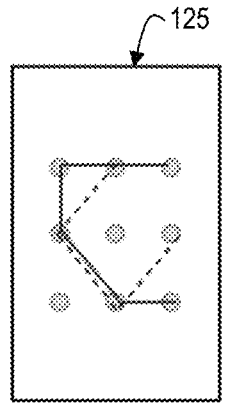
FIGS. 4-12 show examples of user input patterns and decoy patterns in accordance with aspects of the invention.
Figure 5:
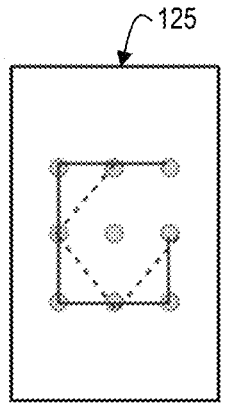
Figure 6:
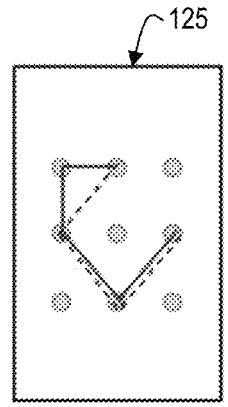
Figure 7:
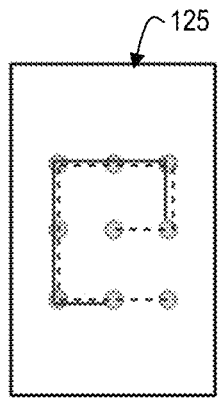
Figure 8:
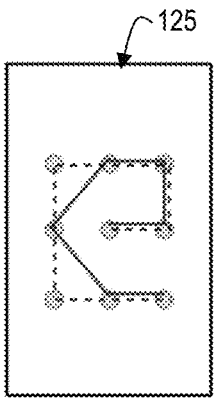
Figure 9:
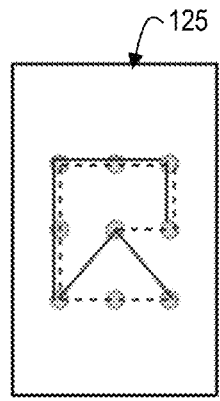
Figure 10:
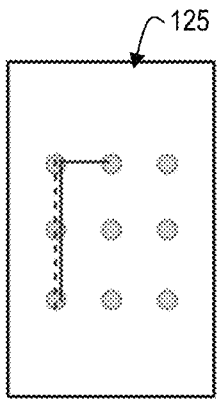
Figure 11:
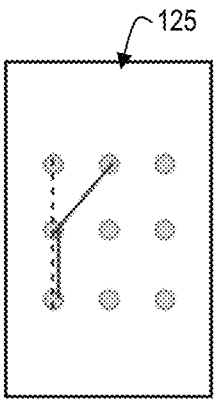
Figure 12:
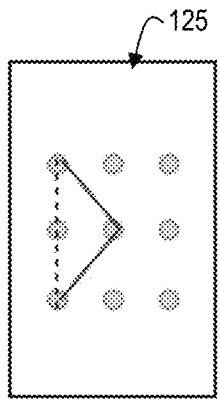

FIGS. 4-6 show different decoy patterns generated for a same user input pattern. FIGS. 7-9 show different decoy patterns generated for a same user input pattern. FIGS. 10-12 show different decoy patterns generated for a same user input pattern. These figures demonstrate how the random selection of decoy nodes can lead to different decoy patterns each time a user enters their same user input pattern.

As illustrated in FIGS. 4 and 5, the decoy pattern may sometimes include more nodes than the user input pattern. As illustrated by FIGS. 7 and 8, the decoy pattern may sometimes include less nodes than the user input pattern.

Adding or removing nodes based on the candidate node selection increases the number of different decoy patters that can be generated for a given user input pattern, which makes it more difficult for an onlooker to reverse engineer the user input pattern.

Figure 13:
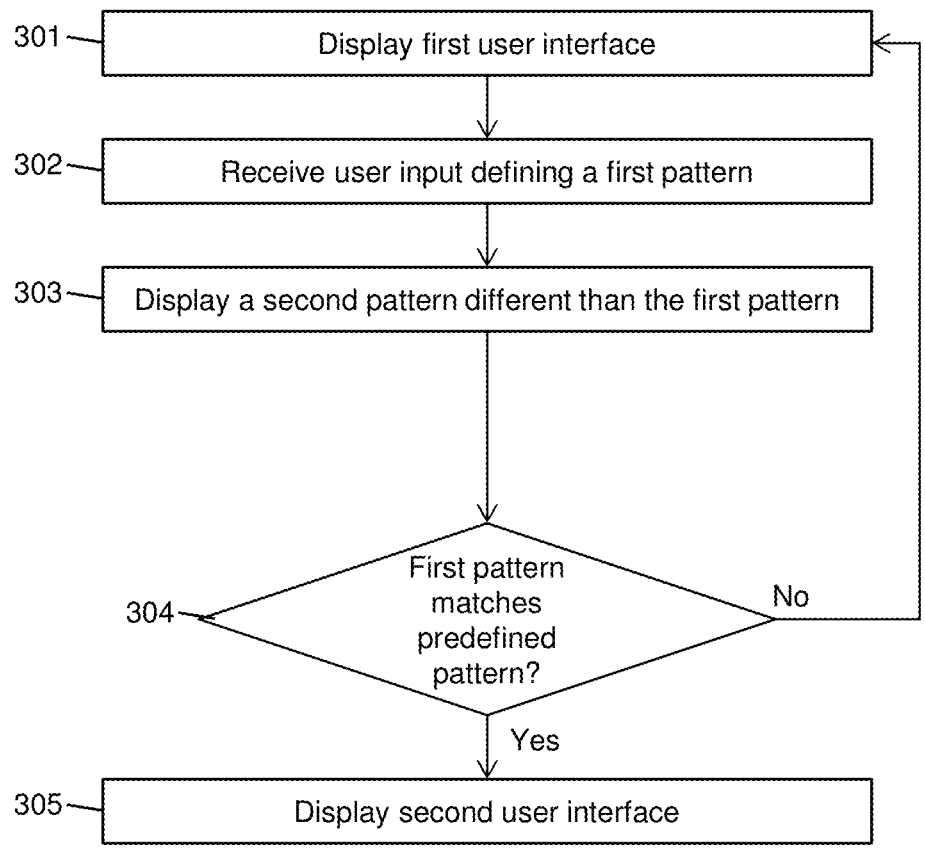
FIG. 13 shows a flowchart of a method in accordance with aspects of the invention.

FIG. 13 shows a flowchart of a method in accordance with aspects of the invention. Steps of the method of FIG. 13 may be performed in the environment illustrated in FIGS. 2A-D and are described with reference to elements and steps described with respect to FIGS. 2A-D. The method can be used for authenticating a user of a mobile device to thereby unlock the mobile device.

At step 301, a computer device displays a first user interface. In embodiments, the computer device is mobile device 100 and the first user interface is lock screen 125 as shown and described with respect to FIGS. 2A-D.

At step 302, the computer device receives a user input defining a first pattern. In embodiments, step 302 includes the mobile device 100 receiving user input at the touchscreen display 115, the user input defining a user input pattern (e.g., user input pattern 130) as shown and described with respect to FIGS. 2A-D. The user input pattern may be an attempt by the user to unlock the mobile device 100.

At step 303, the computer device displays a second pattern that is different than the first pattern. In embodiments, the second pattern is a decoy pattern (e.g., decoy pattern 137) that is generated by the security module 120 and displayed on the display 115, as shown and described with respect to FIG. 2C. The security module 120 generates the decoy pattern in the manner described with respect to FIGS. 3A-C and 4-12, i.e., dynamically based on the user's touch-based inputs to the mobile device 100. In accordance with aspects of the invention, the decoy pattern is displayed in real time (i.e., concurrently with) the user providing the touchscreen input that defines the user input pattern.

At step 304, the computer device compares the first pattern to a predefined pattern. In embodiments, the predefined pattern is a pattern (e.g., pattern 133) defined by data stored on the mobile device 100. In the event the first pattern (the user input pattern) does not match the predefined pattern, then the mobile device 100 remains locked and the process returns to step 301 where the mobile device 100 displays the first user interface again without the second pattern (the decoy pattern) from step 303. In the event the first pattern (the user input pattern) does match the predefined pattern, then the mobile device 100 changes to an unlocked state and displays a second user interface that is different than the first user interface. For example, the second user interface may be a home screen as shown in FIG. 2D or a screen of an active application on the mobile device 100.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   displaying, by a computer device, a lock screen on a touchscreen display;
   receiving, by the computer device, a user input defining a first pattern, wherein the user input is an attempt to unlock the computer device;
   generating, by the computer device, a second pattern based on the user input defining the first pattern, wherein the second pattern is different than the first pattern, and wherein the second pattern is generated concurrently with the receiving the user input defining the first pattern; and
   displaying, by the computer device, the second pattern on the touchscreen display to distract an onlooker while the first pattern defined by the user input to attempt to unlock the computer device is not displayed.

2. The method of claim 1, further comprising:
   comparing, by the computer device, the first pattern to a predefined pattern password; and
   based on the comparing, the computer device performing one of: re-displaying the lock screen on the touchscreen display when the first pattern does not match the predefined pattern password; and displaying a home screen on the touchscreen display when the first pattern does match the predefined pattern password.

3. The method of claim 1, wherein:
   the second pattern is a decoy pattern which includes a plurality of nodes;
   each one of the plurality of nodes is selected randomly from a respective set of candidate nodes;
   each said respective set of candidate nodes comprises one or more nodes that are determined based on the user input defining the first pattern; and
   the number of nodes in the displayed decoy pattern is different than a number of nodes in the first pattern defined by the user input.

4. The method of claim 3, wherein each of the one or more nodes of each said respective set of candidate nodes is assigned a relative weight that affects a probability of being selected.

5. The method of claim 3, wherein the generating the second pattern comprises:

determining the set of candidate nodes based on a starting position of a user's finger when the user begins to enter the user input defining the first pattern; and
determining a first node of a first segment of the second pattern from the determined set of candidate nodes.

6. The method of claim 5, wherein the generating the second pattern comprises:
   determining, after the determining the first node of the first segment of the second pattern and as the user continues to enter the user input defining the first pattern, a next set of candidate nodes for a second node in the second pattern; and
   randomly selecting one of the nodes from the next set of candidate nodes as the second node in the second pattern.

7. The method of claim 6, wherein the determining the next set of candidate nodes is based on a position of the user's finger on the touchscreen display relative to node locations.

8. The method of claim 3, wherein the number of nodes in the displayed decoy pattern is greater than the number of nodes in the first pattern defined by the user input.

9. The method of claim 3, wherein the number of nodes in the displayed decoy pattern is less than the number of nodes in the first pattern defined by the user input.

10. The method of claim 1, wherein the computer device is a mobile device comprising one selected from a group consisting of: a smartphone, a tablet computer, a laptop computer, and a smart watch.

11. A system, comprising:
    a mobile device comprising a processor, a memory, and a touchscreen display,
    wherein an operating system stored in the memory and executed by the processor is configured to:
      display a lock screen on the touchscreen display of the mobile device;
      receive a user input on the touchscreen display, the user input defining a user input pattern that is an attempt by a user to unlock the mobile device;
      dynamically create a decoy pattern based on the user input defining the user input pattern, wherein the decoy pattern is different than the user input pattern; and
      display the decoy pattern concurrently with the receiving the user input defining the user input pattern to distract an onlooker while the user input pattern defined by the user to attempt to unlock the mobile device is not displayed.

12. The system of claim 11, wherein the operating system stored in the memory and executed by the processor is further configured to:
    compare the user input pattern to a predefined pattern; and
    based on the comparing, perform one of: re-display the lock screen on the touchscreen display when the user input pattern does not match the predefined pattern; and display a home screen on the touchscreen display when the user input pattern does match the predefined pattern.

13. The system of claim 11, wherein:
    the decoy pattern includes a plurality of nodes;
    each one of the plurality of nodes is selected randomly from a respective set of candidate nodes;
    each said respective set of candidate nodes comprises one or more nodes that are determined based on the user input defining the first pattern; and the number of nodes in the displayed decoy pattern is different than the number of nodes in the user input pattern defined by the user input.

14. The system of claim 13, wherein candidate nodes included in the sets of candidate nodes are assigned a relative weight that affects the probability of being selected.

15. The system of claim 13, wherein the number of nodes in the displayed decoy pattern is greater than the number of nodes in the user input pattern defined by the user input.

16. The system of claim 13, wherein the number of nodes in the displayed decoy pattern is less than the number of nodes in the user input pattern defined by the user input.

17. The system of claim 11, wherein the creating the decoy pattern comprises:
  determining a set of candidate nodes based on a starting position of a user's finger when the user begins to enter the user input defining the user input pattern;
  determining a first node of a first segment of the decoy pattern from the determined set of candidate nodes;
  determining, after the determining the first node of the first segment of the decoy pattern and as the user continues to enter the user input defining the user input pattern, a next set of candidate nodes for a second node in the decoy pattern; and
  randomly selecting one of the nodes from the next set of candidate nodes as the second node in the decoy pattern.

18. A computer program product for authenticating a user, the computer program product comprising a computer readable storage medium having program instructions embodied therewith, the program instructions executable by a mobile device to cause the mobile device to:
  display a lock screen on a touchscreen display of the mobile device;
  receive a user input on the touchscreen display, the user input defining a user input pattern that is an attempt by the user to unlock the mobile device;
  dynamically create a decoy pattern based on the user input defining the user input pattern; and
  display the decoy pattern concurrently with the receiving the user input defining the user input pattern to distract an onlooker while the user input pattern defined by the user to attempt to unlock the mobile device is not displayed.

19. The computer program product of claim 18, wherein the program instructions are further executable by a mobile device to cause the mobile device to:
  compare the user input pattern to a predefined pattern; and
  based on the comparing, perform one of: re-display the lock screen on the touchscreen display when the user input pattern does not match the predefined pattern; and display a home screen on the touchscreen display when the user input pattern does match the predefined pattern.

20. The computer program product of claim 18, wherein:
  the decoy pattern includes a plurality of nodes;
  each one of the plurality of nodes is selected randomly from a respective set of candidate nodes;
  each said respective set of candidate nodes comprises one or more nodes that are determined based on the user input defining the first pattern; and
  the number of nodes in the displayed decoy pattern is different than the number of nodes in the user input pattern defined by the user input.

* * * * *